(12) United States Patent
Thompson

(10) Patent No.: US 6,868,953 B1
(45) Date of Patent: Mar. 22, 2005

(54) CONCRETE CHUTE APPARATUS

(76) Inventor: Raymond F. Thompson, 9289 Crystal Spring Dr., Conroe, TX (US) 77303

( * ) Notice: Subject to any disclaimer, the term of this patent is extended or adjusted under 35 U.S.C. 154(b) by 0 days.

(21) Appl. No.: 10/127,270

(22) Filed: Apr. 22, 2002

(51) Int. Cl.⁷ .............................................. B65G 11/00
(52) U.S. Cl. ................ 193/10; 193/5; 193/6; 193/2 R
(58) Field of Search .................. 193/5, 6, 10, 2 R, 193/22

(56) References Cited

U.S. PATENT DOCUMENTS

| | | | | |
|---|---|---|---|---|
| 898,977 A | * | 9/1908 | Greenleaf | 193/6 |
| 1,026,641 A | * | 5/1912 | Gardner | 222/547 |
| 3,068,981 A | * | 12/1962 | Stegmeier et al. | 193/10 |
| 3,542,179 A | * | 11/1970 | Prichard | 193/5 |
| 5,186,299 A | * | 2/1993 | Stimson | 193/2 R |
| 5,605,398 A | * | 2/1997 | Cronquist | 366/68 |

* cited by examiner

*Primary Examiner*—Richard Ridley

(57) ABSTRACT

A concrete chute apparatus for preventing the accidental discharge of cement residue from the chute of a cement truck while the truck is moving is disclosed. To attain this, an abutment plate obstructs the opening of a cement truck caused by the folding of an articulated chute. In an embodiment, an abutment plate is rigidly affixed to an over-chute section of the articulated chute such that the plate obscures the concrete path when the over-chute section is rotated to the up position.

16 Claims, 4 Drawing Sheets

CONCRETE CHUTE APPARATUS

BACKGROUND OF THE INVENTION

1. Field of the Invention

The present invention relates to an apparatus for use with cement trucks. More particularly, this invention relates to a new and improved concrete chute apparatus used to prevent accidental discharge of cement from cement trucks while the truck is moving.

2. Description of the Related Art

This invention relates generally to an apparatus for blocking the cement discharge path found on cement trucks, thus preventing the road hazards, property damage, and personal injury caused by debris falling from cement truck chutes.

Cement trucks typically have chutes which are used to pour cement at a construction site. Cement debris may form on the chute after the cement is poured. This cement debris may accidentally fall out of the chute while the truck is returning from the construction site. This may be a hazard to drivers behind the truck and may form undesirable deposits on the roads.

In order to avoid the cement debris from falling out of the chute while returning from the construction site, the chute is often washed off with water at the construction site, and the resulting residue dumped in vacant land or fields. This concrete residue creates environmental problems, as it kills plants, contaminates waterways, and is a source of injury to humans and animals. Consequently, it is increasingly forbidden to wash concrete chutes in this manner. As such, another method to prevent such debris from falling from cement trucks is needed.

Devices that attempt to avoid this problem are known in the prior art. For example, U.S. Pat. No. 5,927,461 to Jamieson discloses an apparatus for automatically sealing an articulated chute. Jamieson '461 essentially describes an apparatus which positions itself under the articulated chute when the chute is in the dispensing position. However, Jamieson '461 does not make any provision for those construction sites where there would be no room for the apparatus below the chute. Further, Jamieson '461 requires numerous, moving parts.

Similarly, U.S. Pat. No. 5,186,299 to Stimson discloses a concrete chute apparatus. Stimson '299 essentially describes an apparatus which is pivotally or hingedly mounted to a chute. Yet, Stimson '299 requires manipulation to be arranged in the correct position. Further, Stimson '299 requires means to prevent the apparatus from being arranged in the incorrect position. For example, Stinson '299 may inadvertently be placed in the closed position while dispensing cement, thus Stimson '299 has the potential to block the chute while cement is being dispensed, which could cause cement to flow over the sides of the chute.

U.S. Pat. No. 5,354,128 to Lewis discloses a concrete mixer chute cap. However, Lewis '128 requires manual placement by the truck driver. Further, such a chute cap may become lost, as it is not fastened to the chute while not in use.

U.S. Pat. No. 5,605,398 to Cronquist discloses a flap for a cement truck back. Cronquist '398 essentially describes an apparatus that positions itself under the articulated chute when the chute is in the dispensing position. However, Cronquist '398 does not make any provision for those construction sites where there would be no room for the apparatus below the chute. Further, Cronquist '398 requires manual placement.

While the above-described devices fulfill their respective, particular objectives and requirements, the aforementioned patents do not describe a device that is positioned above the chute while cement is dispensing. Further, the aforementioned patents do not describe a device that requires no moving parts. The aforementioned patents do not describe a device that cannot become lost or dissociated from the chute, or a device that does not require manual positioning. Furthermore, the above-mentioned patents do not satisfy the additional limitations of the prior art set forth above.

Therefore, a need exists for a new and improved concrete chute apparatus. A need exists for an apparatus that has no moving parts. A need exists for an apparatus that is connected to the chute and thus cannot become lost. A need exists for an apparatus that does not require or occupy space below the cement chute. Finally, a need exists for an apparatus that does not require manual placement. In these regards, the present invention substantially fulfills these needs. In this respect, the concrete chute apparatus according to the present invention substantially departs from the conventional concepts and designs of the prior art, and in doing so provides an apparatus primarily developed for the purpose of blocking the cement discharge path.

SUMMARY OF THE INVENTION

In view of the foregoing disadvantages inherent in the known types of devices to prevent falling cement debris now present in the prior art, the present invention provides an improved concrete chute apparatus, and overcomes the above-mentioned disadvantages and drawbacks of the prior art. As such, the general purpose of the present invention, which will be described subsequently in greater detail, is to provide a new and improved concrete chute apparatus which has all the advantages of the prior art mentioned heretofore and many novel features that result in a concrete chute apparatus which is not anticipated, rendered obvious, suggested, or even implied by the prior art, either alone or in any combination thereof.

To attain this, the present invention essentially comprises a plate attached to the rotatable section of a cement truck's chute, such that the plate blocks the opening created when the rotatable section is rotated up, thereby preventing cement residue or debris from falling from the truck.

There has thus been outlined, rather broadly, the more important features of the invention in order that the detailed description thereof that follows may be better understood and in order that the present contribution to the art may be better appreciated.

The invention may also include mounting hardware to couple the plate to the chute. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved concrete chute apparatus suitable for use on concrete delivery vehicles, concrete mixers, and other reservoirs of flowable materials, such as cement, uncured concrete, gunite, and gravel, which apparatus prevents the unwanted discharge of material from an articulated chute and prevents debris from falling from such a vehicle while it is moving on roads or highways, thereby preventing road hazards, property damage, injury, or death.

It is a further object of this invention to provide a concrete chute apparatus that is completely automatic to the extent that its operation requires no extra action by a driver or operator. Furthermore, an object of the invention is to provide an apparatus having no moving parts, which apparatus is in proper placement with respect to the chute at all times. It is therefore another object of this invention to provide an apparatus that is rugged and reliable, and which may be operated safely, having no pinch points, which could injure an operator.

It is another object of the present invention to provide a new and improved concrete chute apparatus that may be permanently attached to a chute, is simple and inexpensive to manufacture, easy to install, has a long useful life, and may be easily and efficiently manufactured and marketed.

An even further object of the present invention is to provide a new and improved concrete chute apparatus that has a low cost of manufacture with regard to both materials and labor, and which accordingly is then susceptible of low prices of sale to the consuming public, thereby making such concrete chute apparatus economically available to the buying public.

Still another object of the present invention is to provide a new concrete chute apparatus that provides in the apparatuses and methods of the prior art some of the advantages thereof, while simultaneously overcoming some of the disadvantages normally associated therewith.

It is accordingly a principal object of the present invention to provide, an improved apparatus for blocking the discharge path of a cement-dispensing chute found on a cement truck.

It is still another object of the present invention to provide an apparatus that is readily installable and substantially maintenance free.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

Figure 1:
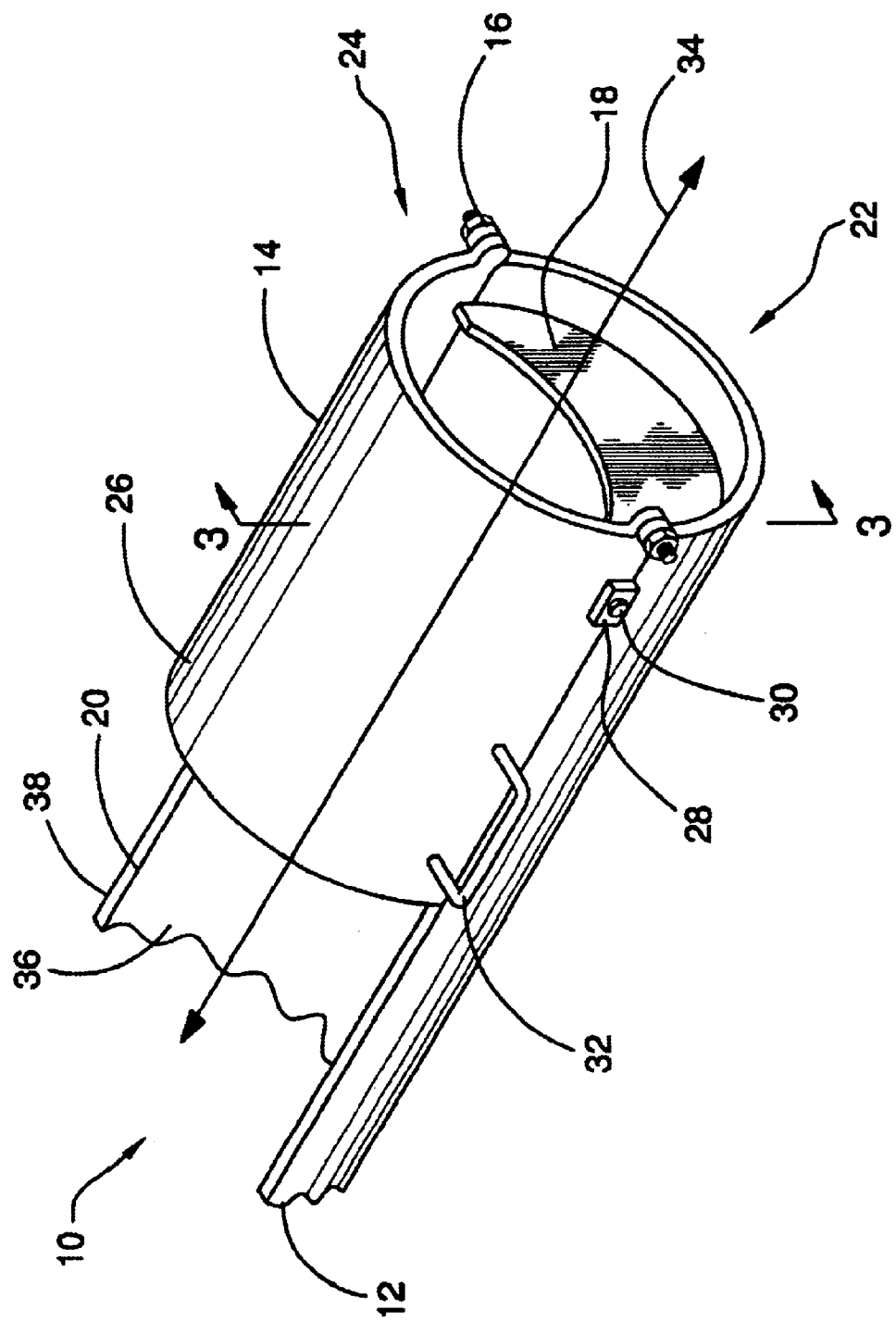
FIG. 1 is an oblique view of an embodiment of the apparatus of the present invention while the over-chute is resting on the main chute.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Referring now to the drawings, and particularly to FIGS. 1–4, a concrete discharge chute employing a preferred embodiment of the concrete chute apparatus of the present invention is shown and generally designated by the reference numeral 10.

In FIG. 1, a concrete discharge chute 10 is shown Concrete discharge chute 10 is arranged in cooperation with a conventional cement truck (not shown) and includes a main chute section 12 to which is hingeably coupled to over-chute section 14. Main chute section 12 and over-chute section 14 form an elongated chute having a concave interior through which cement can be dispensed when over-chute section 14 is in the down position. Main chute section 12 has a distal end 22 and a proximal end 20, where the proximal end is that end closest to the cement truck. Similarly, over-chute section 14 has a distal end 26 and a proximal end 24, where the distal end is that end furthest from the truck when over-chute section 14 is in its down position. The chute sections further include distal end surfaces substantially orthogonally oriented relative to a chute axis.

In FIG. 1, over-chute section 14 is shown in its up position. This position is used when the concrete truck is traveling on roads and highways. To place the discharge chute 10 in this position, over-chute section 14 rotates counter-clockwise about chute hinge 16 and comes to rest on the main chute section 12 as shown. In an embodiment, the discharge chute 10 may have oversized hinge portions of the chute sections such that the length of the chute section sidewalls are not in contact with one another.

When over-chute section 14 is in this up position, a circular opening is formed between the over-chute section 14 and the main chute section 12. The new and improved concrete chute apparatus 18, located at the distal end of the main chute 22, is shown obscuring the aforementioned opening. Such apparatus may also be referred to as abutment plate 18, as the apparatus abuts an inner surface of main chute section 12 to prevent the discharge of cement or cement debris. Consequently, plate 18 is shown in FIG. 1 in its "in use" position. That is, abutment plate 18 is shown in that position that prevents concrete debris from falling from concrete discharge chute 10. By positioning the abutment plate 18 within the main chute 12, cement debris and residue in concrete discharge chute 10 is prevented from accidentally discharging from the truck.

Abutment plate 18 is mounted to over-chute section 14 such that abutment plate 18 remains stationary with respect to over-chute section 14. Abutment plate 18 is mounted to a chute first edge 36 spaced from and parallel to a chute second edge 38. Abutment plate 18 may be welded or riveted or otherwise directly mounted onto over-chute section 14 using any metal fastening method. Alternately, abutment plate 18 may be mounted via plate-mounting bracket 28 and plate-mounting means 30. In the preferred embodiment shown, plate-mounting means 30 may be a bolt. Plate 18 is mounted to the proximal end 24 of over-chute section 14 such that abutment plate 18 is arranged within the distal end 22 of main chute 12 when over-chute section 14 is in the up, or traveling, position. Placement at the distal end 22 of main chute 12 allows abutment plate 18 to accommodate a larger volume of concrete debris within the main chute section 12 than would be possible if abutment plate 18 were arranged at, for example, the proximal end 20 of main chute 12.

Figure 2:
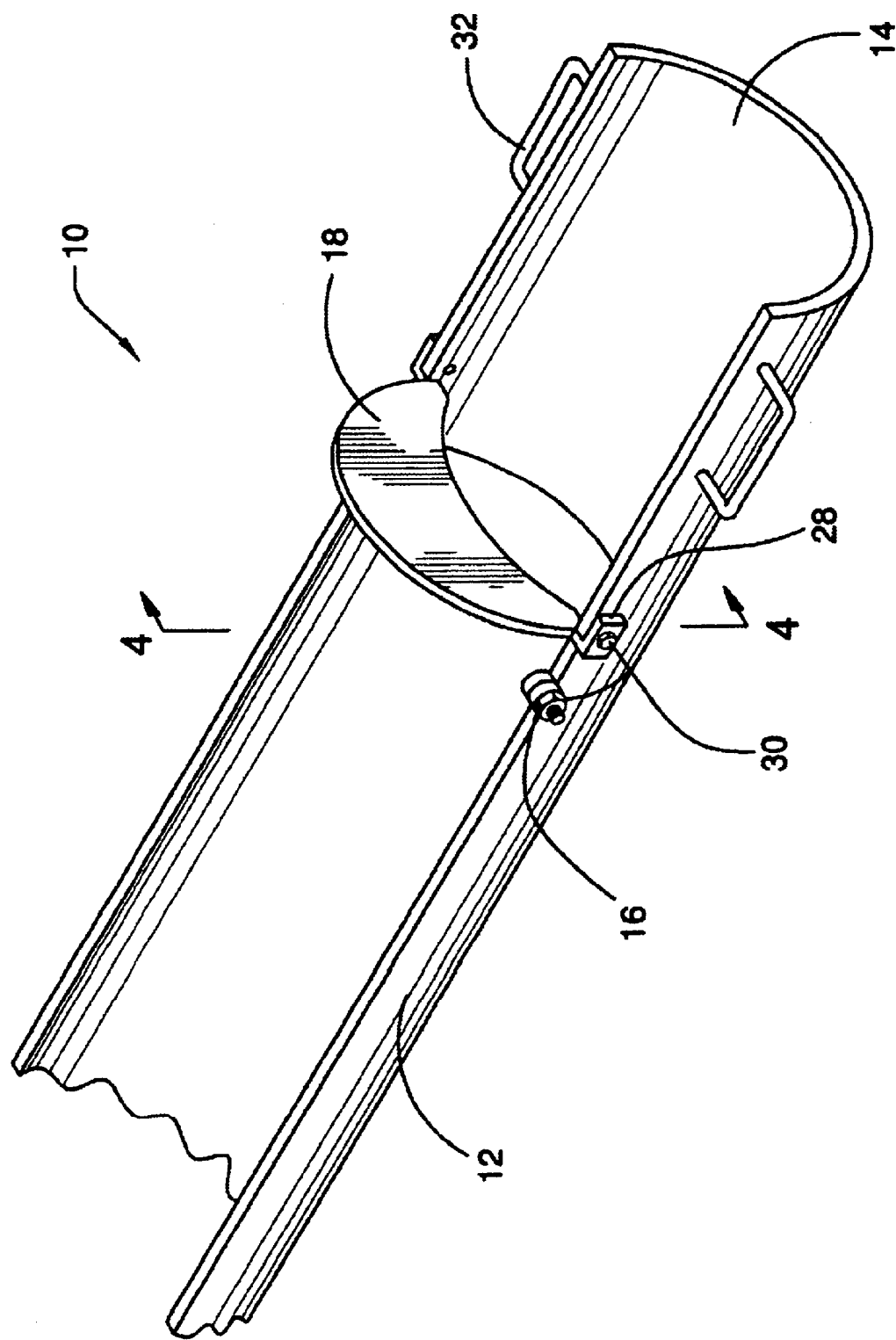
FIG. 2 is a oblique view of an embodiment of the apparatus of the present invention while the over-chute is not resting on the main chute.

Referring to FIG. 2, the over-chute section 14 is shown in the down, or dispensing, position. Chute handle 32 would be used to rotate the over-chute section 14 about the chute hinge 16, thus positioning over-chute section 14 in either the up or down position. As noted above, plate 18 remains stationary with respect to over-chute section 14. Consequently, abutment plate 18 is arranged above the concrete discharge chute 10 when the over-chute section is in the down position More particularly, abutment plate 18 is arranged above over-chute section 14.

Abutment plate 18 includes an arcuate bottom wall orthogonally oriented between the front and rear parallel walls of the plate. It is noted that the arcuate abutment plate bottom wall is arranged to form complementary reception within the concave interior surface of the main chute section 12. Abutment plate 18 may have an arcuate top wall 42 configured to allow the material dispensed from the discharge chute 10 to extend somewhat above the level of the sidewall extents of the chute sections. In an embodiment, abutment plate 18 may include a straight top wall. In yet another embodiment, abutment plate 18 may include an arcuate portion coupled with at least one linear portion, as shown.

Figure 3:
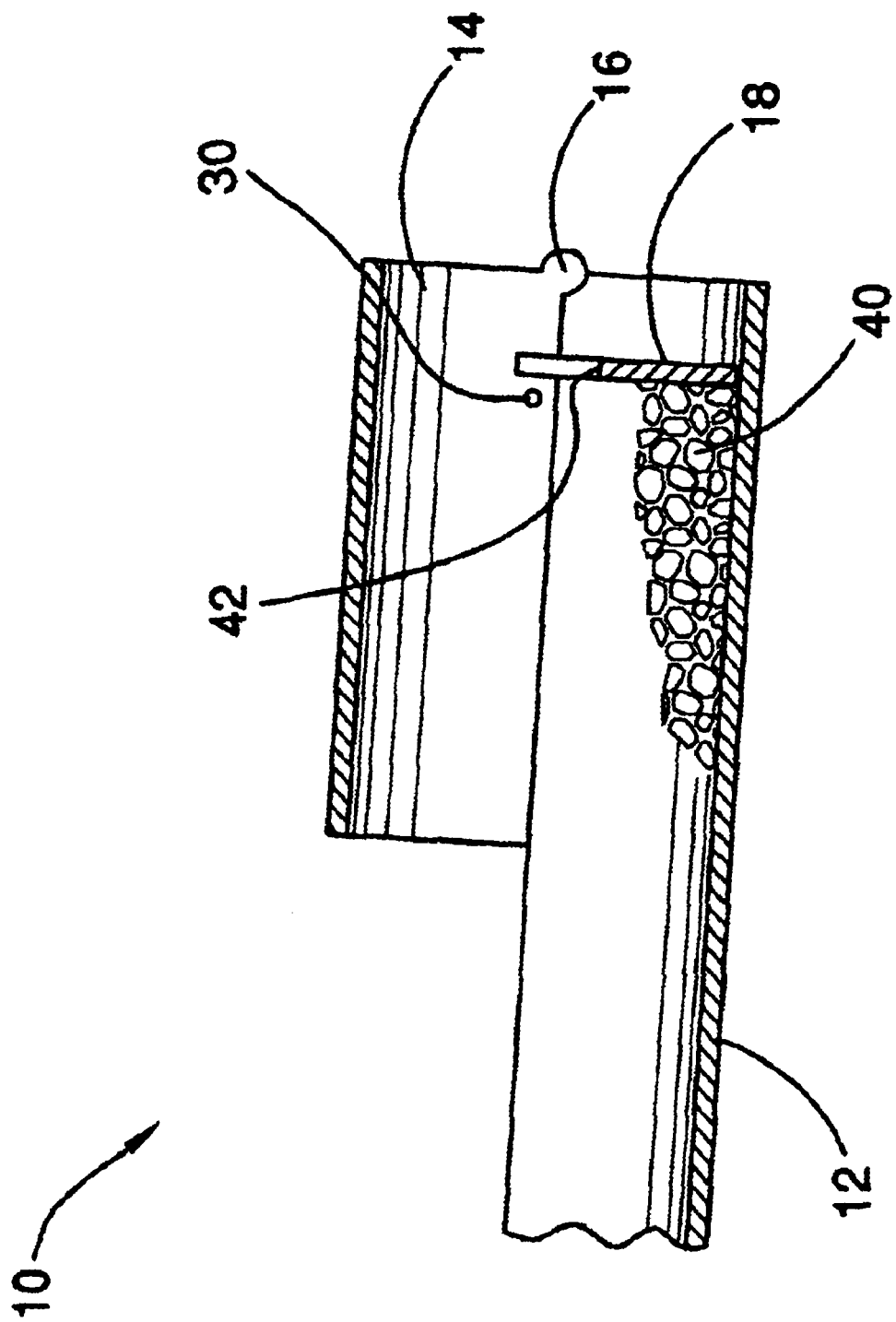
FIG. 3 is a cross-section view of an embodiment of the apparatus of the present invention. The cross-section is taken on line 3 of FIG. 1.

FIG. 3 is a cross sectional view taken on line 3 of FIG. 1. Shown in FIG. 3 is the abutment plate 18 in use. That is, abutment plate 18 is in the down position, and is preventing discharge of cement 40 located within main chute section 12. Abutment plate 18 may retain cement 40 unless the level of cement 40 exceeds the height of arcuate top wall 42. Abutment plate 18 is therefore constructed of a rigid material having sufficient strength to hold material dispensed from discharge chute 10. In an embodiment, abutment plate may be of the same material as the discharge chute 10. In an embodiment, abutment plate may be metal, metal alloy, rigid plastic, or composite.

Also shown in FIG. 3 by way of example is plate-mounting means 30 in a position offset from abutment plate 18. In an alternate embodiment, plate-mounting means 30 may be commensurate with abutment plate 18. Plate mounting means 30 may be any means known in the art to attach abutment plate 18 to over-chute 14.

Figure 4:
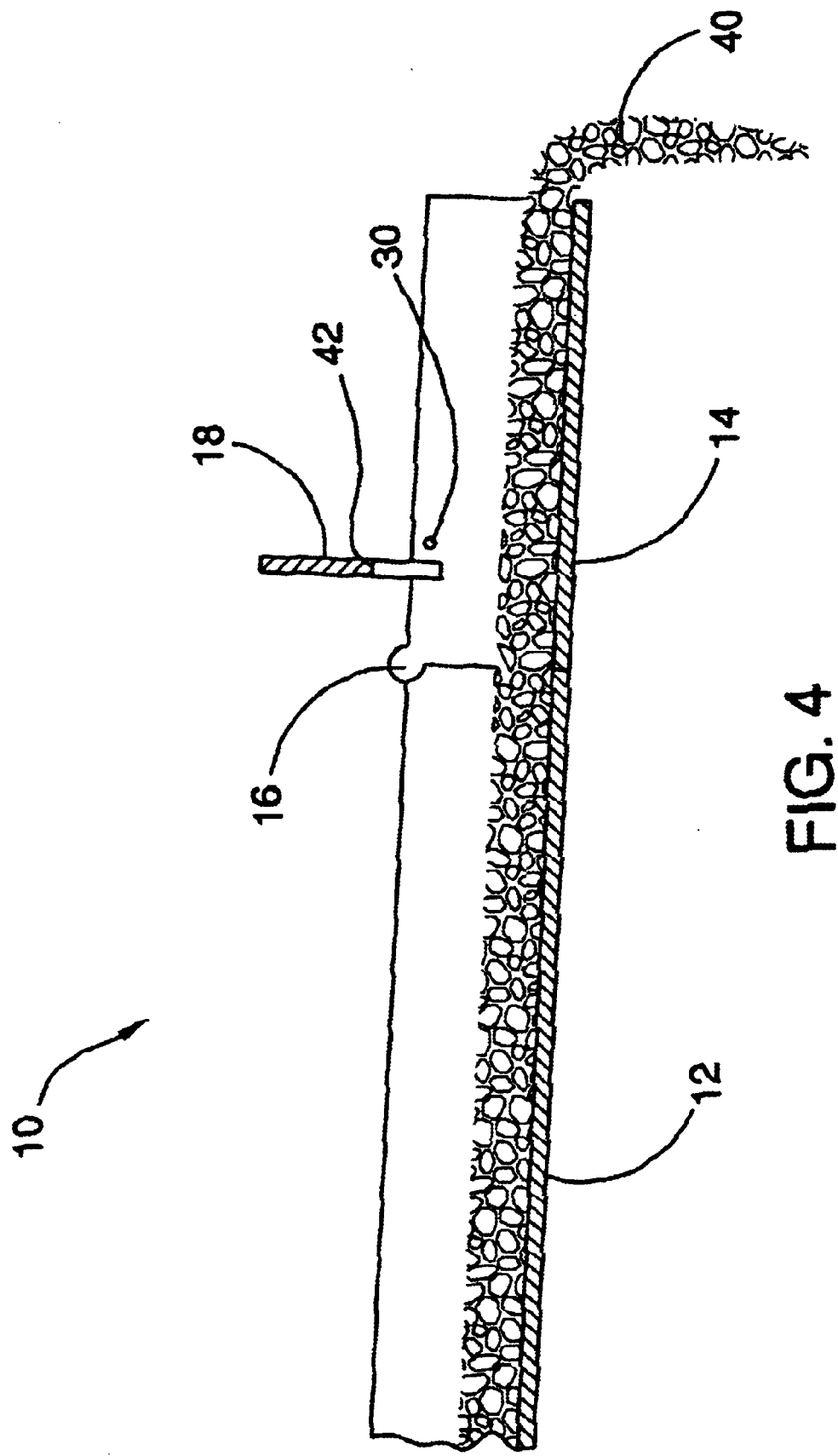
FIG. 4 is a cross-section view of an embodiment of the apparatus of the present invention. The cross-section is taken on line 4 of FIG. 2.

FIG. 4 is a cross-sectional view of FIG. 2 along line 4. FIG. 4 illustrates dispense of cement from concrete discharge chute 10 while abutment plate 18 is in use. As shown, abutment plate 18 is arranged above over-chute chute section 14. The material dispensed may pass unaffected by the presence of abutment plate 18. This may also be true in those cases in which a large volume of material is discharged, such that the discharge chute is completely full and material extends above the sidewalls in those areas of the chute closest to the chute axis. For example, arcuate top wall 42 of abutment plate 18 will allow dispense of cement, for example, to pass beneath, even if the level of the cement rises above the sidewalls of the chute.

In use, it can now be understood that the concrete chute apparatus described herein would provide a substantially maintenance free apparatus which would in function provide a means to prevent debris from falling from the chute of a cement truck or similar vehicle having an articulated chute. The abutment plate 18 would not require independent adjustment, and would therefore always be in the correct position. The abutment plate 18 has no moving parts which could malfunction or which would require servicing. Further, the abutment plate 18 is attached to the discharge chute 10 and therefore could not become lost.

While a preferred embodiment of the concrete chute apparatus inline water treatment system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

For example, any suitably rigid material may be used for the concrete chute apparatus. Further, the apparatus may be attached to the over-chute using any metal fastening means known in the art.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus which prevents the unintentional escape of cement from a cement truck comprising:
   a main chute;
   an over-chute hingeably connected to the main chute, the hinged connection of the over-chute to the main chute being such that the over-chute can be positioned to rest on top of the main chute and the hinged connection being such that the over-chute can be folded down from this resting position so that the main chute and over-chute section form an elongated chute through which cement can be poured; and
   an abutment plate connected to the over-chute such that when the over-chute is positioned to rest on the main chute, the abutment plate is positioned within the main chute so as to block material from the main chute, and when the over-chute is folded down, the abutment plate is positioned above the main chute and the over-chute.

2. The device as recited in claim 1, wherein each chute has a proximal end and a distal end, wherein the distal ends are those ends furthest from the cement truck when the over-chute is folded down, and wherein the abutment plate is connected to the proximal end of the over-chute so as to position the abutment plate at the distal end of the main chute when the over-chute is positioned to rest above the main chute.

3. The device as recited in claim 1, further comprising a plate-mounting bracket, wherein the plate-mounting bracket connects the plate to the over-chute.

4. The device as recited in claim 1, wherein the plate comprises a bottom wall orthogonally oriented between front and rear parallel walls.

5. The device as recited in claim 1, wherein the plate comprises a top wall orthogonally oriented between front and rear parallel walls.

6. The device as recited in claim 4, wherein the bottom wall is substantially arcuate.

7. The device as recited in claim 5, wherein the top wall of the abutment plate is substantially arcuate.

8. The device as recited in claim 5, wherein the top wall of the abutment plate has a portion that is substantially arcuate and a portion that is substantially linear.

9. The device as recited in claim 1, wherein the abutment plate is made of metal.

10. A concrete chute apparatus, comprising:
    a concrete discharge chute, wherein the chute is oriented about a chute axis, wherein the chute is of a substantially semi-cylindrical configuration and includes a chute first edge spaced from and parallel to a chute second edge, wherein the chute has a concave interior surface, and wherein the chute comprises an over-chute section, wherein the over-chute section includes a proximal end surface and a distal end surface, and wherein the end surfaces are orthogonally oriented relative to the chute axis, and an abutment plate, wherein the abutment plate includes a mounting means affixed to the over-chute section first edge, which mounting means holds the abutment plate station immobile relative to the over-chute section and in an orthogonal orientation to the chute axis.

11. The device as recited in claim 10, wherein the plate comprises a bottom wall orthogonally oriented between front and rear parallel walls.

12. The device as recited in claim 10, wherein the plate comprises a top wall orthogonally oriented between front and rear parallel walls.

13. The device as recited in claim 11, wherein the bottom wall is substantially arcuate in shape.

14. The device as recited in claim 12, wherein the top wall is substantially arcuate in shape.

15. The device as recited in claim 10, wherein the abutment plate is made of metal.

16. The device as recited in claim 10, wherein the abutment plate is integral to the over-chute section.

* * * * *